United States Patent
Miyabe et al.

(10) Patent No.: US 11,334,715 B2
(45) Date of Patent: May 17, 2022

(54) TOPIC-IDENTIFYING INFORMATION PROCESSING DEVICE, TOPIC-IDENTIFYING INFORMATION PROCESSING METHOD, AND TOPIC-IDENTIFYING COMPUTER PROGRAM PRODUCT

(71) Applicants: KABUSHIKI KAISHA TOSHIBA, Minato-ku (JP); TOSHIBA DIGITAL SOLUTIONS CORPORATION, Kawasaki (JP)

(72) Inventors: Yasunari Miyabe, Kawasaki (JP); Kazuyuki Goto, Kawasaki (JP); Kenta Cho, Kawasaki (JP); Masahisa Shinozaki, Tokorozawa (JP); Keisuke Sakanushi, Mitaka (JP)

(73) Assignees: KABUSHIKI KAISHA TOSHIBA, Minato-ku (JP); TOSHIBA DIGITAL SOLUTIONS CORPORATION, Kawasaki (JP)

(*) Notice: Subject to any disclaimer, the term of this patent is extended or adjusted under 35 U.S.C. 154(b) by 390 days.

(21) Appl. No.: 16/440,323

(22) Filed: Jun. 13, 2019

(65) Prior Publication Data

US 2019/0294624 A1 Sep. 26, 2019

Related U.S. Application Data

(63) Continuation of application No. PCT/JP2017/034583, filed on Sep. 25, 2017.

(30) Foreign Application Priority Data

Dec. 13, 2016 (JP) .............................. JP2016-240931

(51) Int. Cl.
*G06F 40/268* (2020.01)
*G06F 16/35* (2019.01)
(Continued)

(52) U.S. Cl.
CPC ............ *G06F 40/268* (2020.01); *G06F 16/00* (2019.01); *G06F 16/35* (2019.01); *G06F 40/20* (2020.01);
(Continued)

(58) Field of Classification Search
CPC ...... G06F 16/35; G06F 16/353; G06F 16/355; G06F 16/358; G06F 40/20; G06F 40/205;
(Continued)

(56) References Cited

U.S. PATENT DOCUMENTS 5,708,822 A * 1/1998 Wical .................... G06F 40/253
704/1
5,826,219 A * 10/1998 Kutsumi ................. G06F 40/56
704/4

(Continued)

FOREIGN PATENT DOCUMENTS

| JP | 2005-196572 | 7/2005 |
|---|---|---|
| JP | 2008-9552 | 1/2008 |
| JP | 2016-103156 | 6/2016 |

OTHER PUBLICATIONS

Specification of U.S. Appl. No. 62/191,120, filed Jul. 10, 2015 (Year: 2015).*

(Continued)

*Primary Examiner* — Eric Yen
(74) *Attorney, Agent, or Firm* — Oblon, McClelland, Maier & Neustadt, L.L.P.

(57) ABSTRACT

An information processing device includes a divider and an identifier. The divider divides a plurality of sentences included in a processing target sentence set into a plurality of groups based on a supervised topic list representing a list of supervised topic name that is set in advance. The identifier identifies a topic name for each of the groups based on the supervised topic list.

11 Claims, 12 Drawing Sheets

(51) Int. Cl.
*G06N 7/00* (2006.01)
*G06F 16/00* (2019.01)
*G06F 40/20* (2020.01)
*G06F 40/289* (2020.01)
*G06F 40/205* (2020.01)
*G06F 40/30* (2020.01)

(52) U.S. Cl.
CPC .......... *G06F 40/205* (2020.01); *G06F 40/289* (2020.01); *G06F 40/30* (2020.01); *G06N 7/005* (2013.01)

(58) Field of Classification Search
CPC .... G06F 40/268; G06F 40/284; G06F 40/289; G06F 40/30; G06F 16/00; G06N 7/005
See application file for complete search history.

(56) References Cited

U.S. PATENT DOCUMENTS

| | | | | |
|---|---|---|---|---|
| 6,772,120 B1* | 8/2004 | Moreno | ................ | G06F 40/216 704/256 |
| 6,775,677 B1* | 8/2004 | Ando | ................ | G06F 16/3347 707/739 |
| 6,826,724 B1* | 11/2004 | Shimada | ................ | G06F 40/131 715/234 |
| 6,963,830 B1* | 11/2005 | Nakao | ................ | G06F 16/345 704/1 |
| 7,739,253 B1* | 6/2010 | Yanovsky | ........... | G06F 16/9535 707/705 |
| 8,386,487 B1* | 2/2013 | Ben-Artzi | ............. | G06F 16/907 707/737 |
| 8,554,701 B1* | 10/2013 | Dillard | ................ | G06F 40/30 706/12 |
| 9,092,428 B1* | 7/2015 | Zhang | ................ | G06F 40/30 |
| 9,110,984 B1* | 8/2015 | Lewis | ................ | G06F 16/36 |
| 9,552,399 B1* | 1/2017 | Browning | ............. | G06Q 50/01 |
| 9,659,084 B1* | 5/2017 | Zhang | ................ | G06F 16/338 |
| 9,984,062 B1* | 5/2018 | Strope | ................ | G06F 16/35 |
| 10,049,148 B1* | 8/2018 | Fang | ................ | G06F 16/285 |
| 2003/0081811 A1* | 5/2003 | Shimizu | ................ | G06F 40/137 382/100 |
| 2004/0225667 A1* | 11/2004 | Hu | ................ | G06F 16/345 |
| 2006/0004561 A1* | 1/2006 | Zhang | ................ | G06F 16/355 704/4 |
| 2006/0101102 A1* | 5/2006 | Su | ................ | G06F 16/358 |
| 2007/0260564 A1* | 11/2007 | Peters | ................ | G06F 40/279 706/14 |
| 2008/0312904 A1* | 12/2008 | Balchandran | ......... | G06F 40/216 704/9 |
| 2008/0312906 A1* | 12/2008 | Balchandran | ........... | G06F 16/35 704/9 |
| 2010/0185689 A1* | 7/2010 | Hu | ................ | G06F 40/289 707/803 |
| 2011/0167027 A1* | 7/2011 | Tsuchida | ............... | G06F 40/279 706/12 |
| 2012/0029910 A1* | 2/2012 | Medlock | ............... | G06F 3/0482 704/9 |
| 2014/0100703 A1* | 4/2014 | Dull | ................ | F03D 17/00 700/289 |
| 2014/0101144 A1* | 4/2014 | Liu | ................ | G06F 16/9577 707/723 |
| 2014/0136506 A1* | 5/2014 | Ratner | ................ | G06F 16/951 707/706 |
| 2015/0032452 A1* | 1/2015 | Lev-Tov | ................ | G06F 16/355 704/245 |
| 2015/0248476 A1* | 9/2015 | Weissinger | ............. | H04L 65/60 707/737 |
| 2015/0347392 A1* | 12/2015 | Cavalin | ................ | G06F 40/284 704/9 |
| 2016/0350410 A1* | 12/2016 | Aharoni | ............... | G06F 16/3344 |
| 2017/0018269 A1* | 1/2017 | Lev | ................ | G06F 40/289 |
| 2017/0270222 A1* | 9/2017 | Wang | ................ | G06F 16/583 |
| 2018/0189387 A1* | 7/2018 | Kim | ................ | G06F 16/381 |
| 2021/0124783 A1* | 4/2021 | Ben-Simhon | ........... | G06F 17/18 |

OTHER PUBLICATIONS

International Search Report dated Nov. 7, 2017 in PCT/JP2017/034583 filed Sep. 25, 2017 (with English Translation).
Written Opinion dated Nov. 7, 2017 in PCT/JP2017/034583 filed Sep. 25, 2017.

* cited by examiner

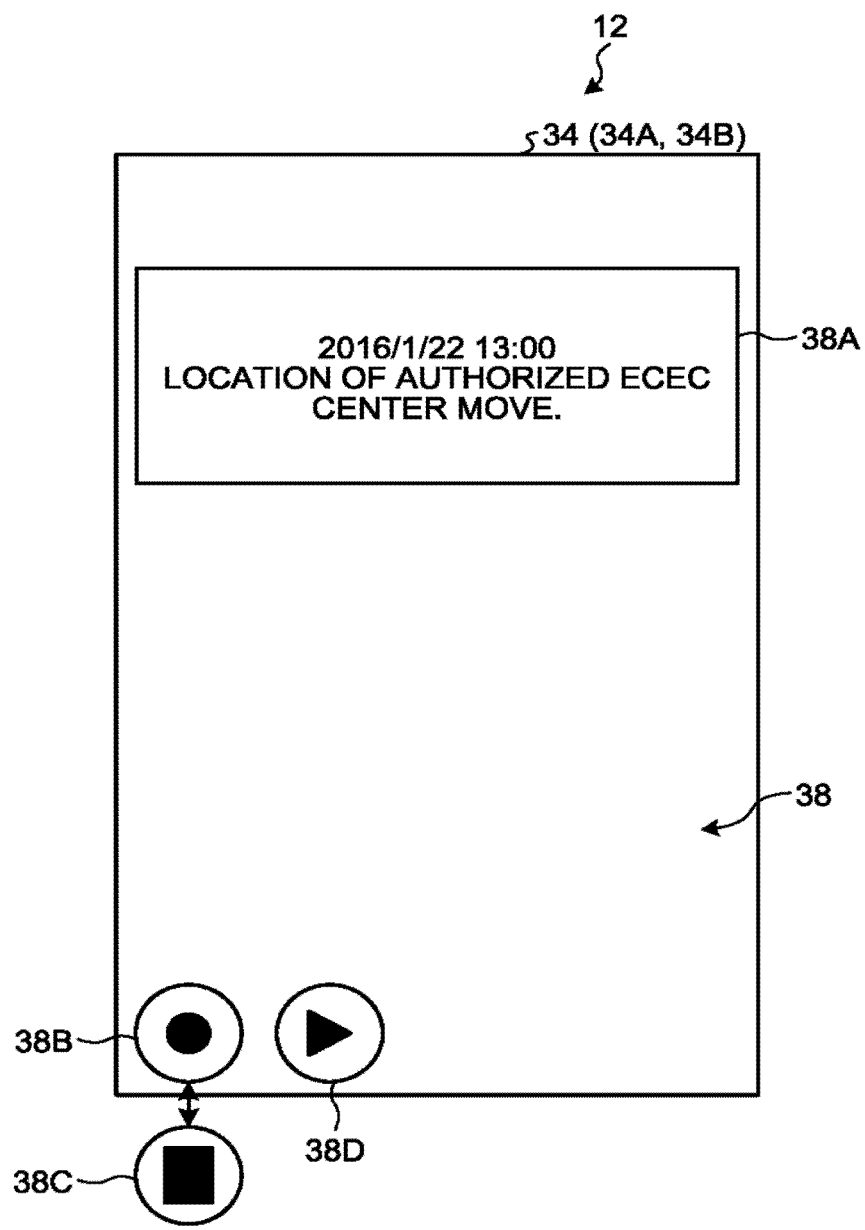

FIG.3

HISTORY MANAGEMENT DB 16A

| SENTENCE ID | SPEECH TIMING | FILE | SENTENCE | MORPHEME |
|---|---|---|---|---|
| 1 | 2016/1/22/13:00 | | THE LOCATION OF THE AUTHORIZED ECEC CENTER MOVES. | /THE/LOCATION/OF/THE/AUTHORIZED ECEC CENTER/MOVES |
| 2 | 2016/1/22/13:02 | | LET ME TALK ABOUT AUTHORIZED ECEC CENTERS. | /LET/ME/TALK/ABOUT/AUTHORIZED ECEC CENTERS |
| 3 | 2016/1/22/13:05 | | LET'S MAKE THE ADMISSION PROCEDURE FOR AUTHORIZED ECEC CENTERS TRANSPARENT. | /LET'S/MAKE/THE/ADMISSION/PROCEDURE/FOR/ AUTHORIZED ECEC CENTERS/TRANSPARENT |
| 4 | 2016/1/22/13:06 | | HOW IS THE AUTHORIZATION GOING? | /HOW/IS/THE/AUTHORIZATION/GOING |
| 5 | 2016/1/22/13:07 | AAAA.WAV | WHAT ABOUT NON-AUTHORIZED ECEC CENTERS? | /WHAT/ABOUT/NON-AUTHORIZED ECEC CENTERS |
| 6 | 2016/1/22/13:08 | | THE ADMISSION PROCEDURE FOR AUTHORIZED ECEC CENTERS IS DIFFICULT. | /THE/ADMISSION/PROCEDURE/FOR/AUTHORIZED ECEC CENTERS/IS/DIFFICULT |
| 7 | 2016/1/22/13:10 | | THE NEXT IS A QUESTION ABOUT CHILD-CARE SUPPORT. | /THE/NEXT/IS/A/QUESTION/ABOUT/CHILD-CARE SUPPORT |
| 8 | 2016/1/22/13:12 | | LET'S MAKE A SOCIETY-WIDE SUPPORT FOR CHILD CARE. | /LET'S/MAKE/A/SOCIETY/WIDE/SUPPORT/FOR/ CHILD CARE |
| 9 | 2016/1/22/13:17 | | IT'S ABOUT MEASURES FOR REDUCING THE BURDEN IMPOSED BY CHILD CARE. | /IT'S/ABOUT/MEASURES/FOR/REDUCING/THE/ BURDEN/IMPOSED/BY/CHILD CARE |
| 10 | 2016/1/22/13:20 | | NOW, PLEASE LET ME INTRODUCE MYSELF. | /NOW/PLEASE/LET/ME/START/WITH/MY/ GREETINGS |

FIG.4

SUPERVISED TOPIC LIST

16B

| SUPERVISED TOPIC NAME | SENTENCES/WORDS |
|---|---|
| AUTHORIZED ECEC CENTER | AUTHORIZED ECEC CENTER, ADMISSION PROCEDURE, ··· |
| CHILD-CARE SUPPORT | ABOUT CHILD-CARE SUPPORT, CHILD CARE, MEASURES, ··· |
| BIRTH | PREGNANT WOMAN, BIRTH, TIME OF BIRTH, DELIVERY, ··· |
| | · |
| | · |
| | · |

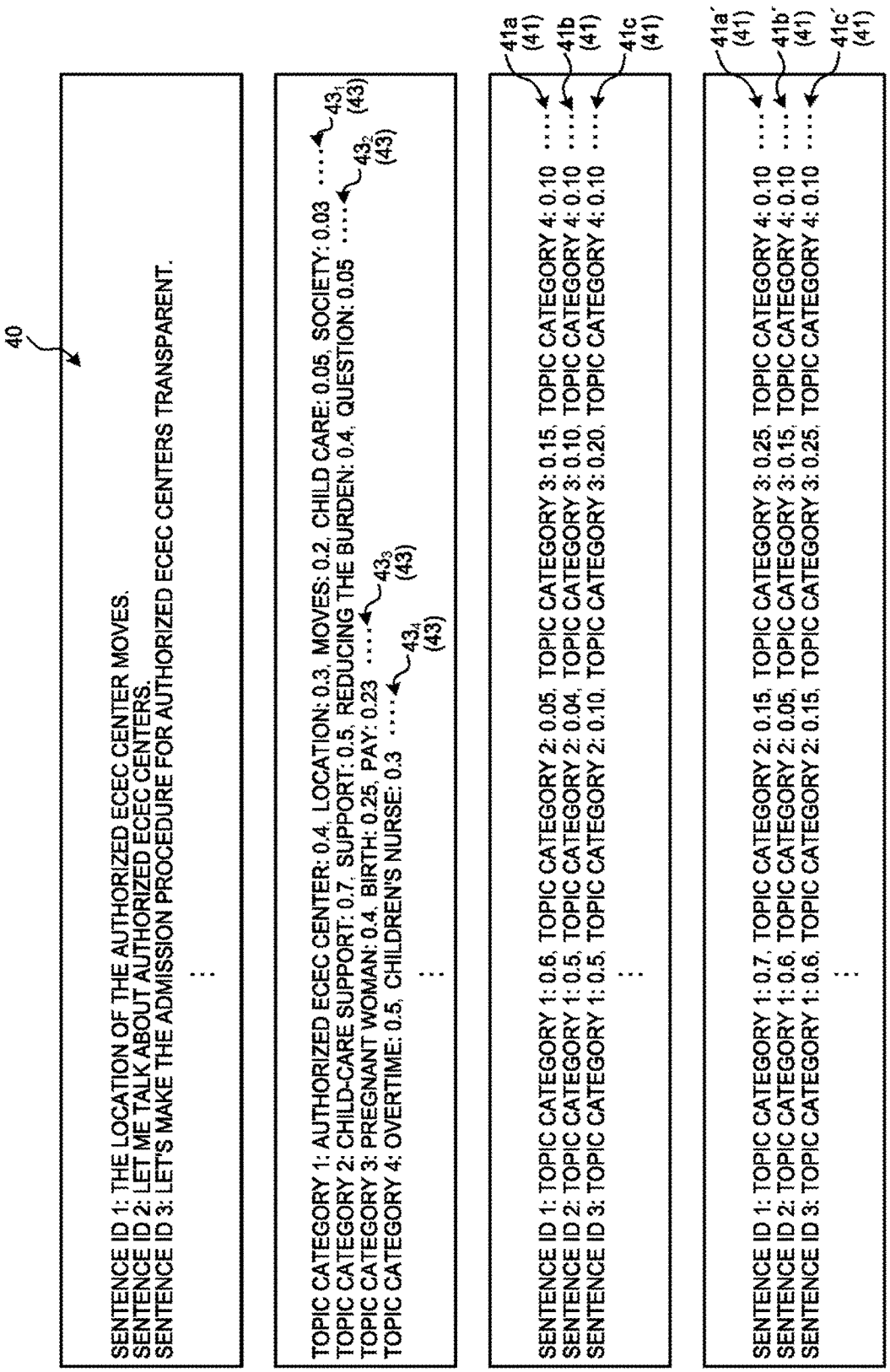

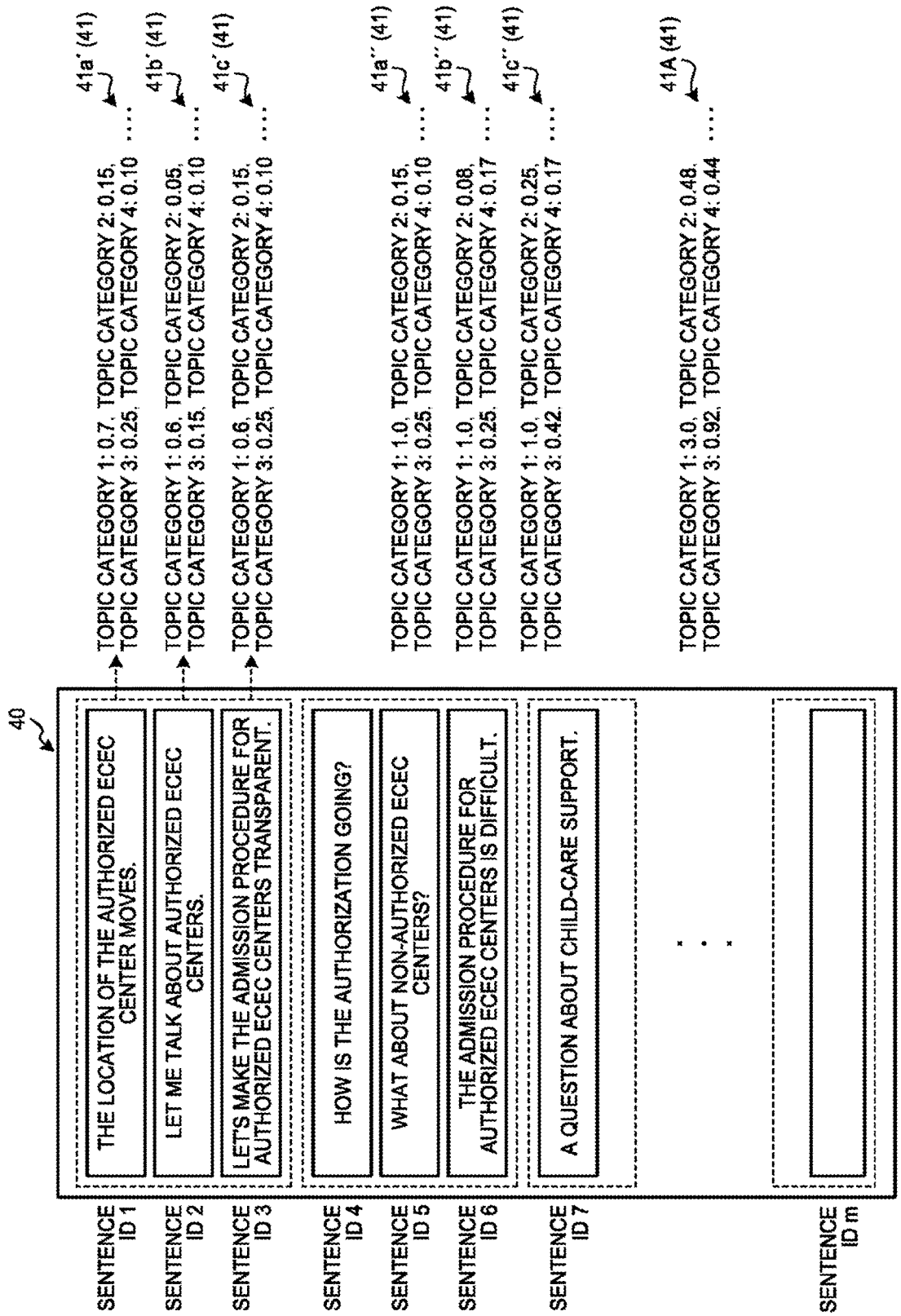

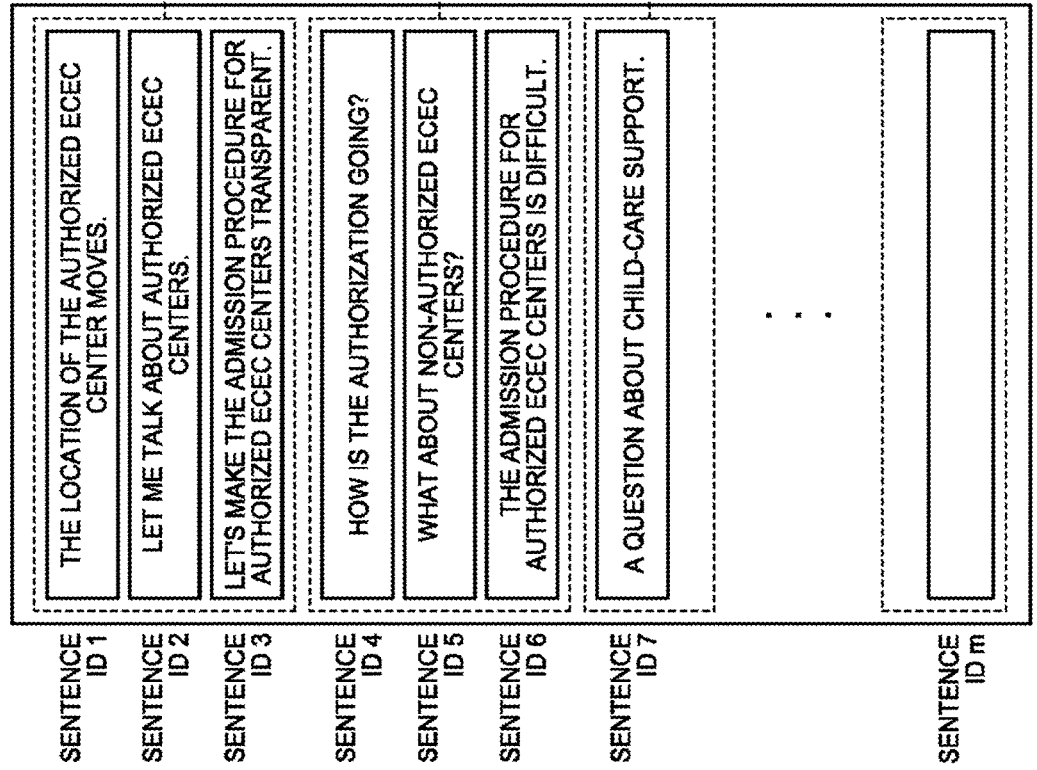

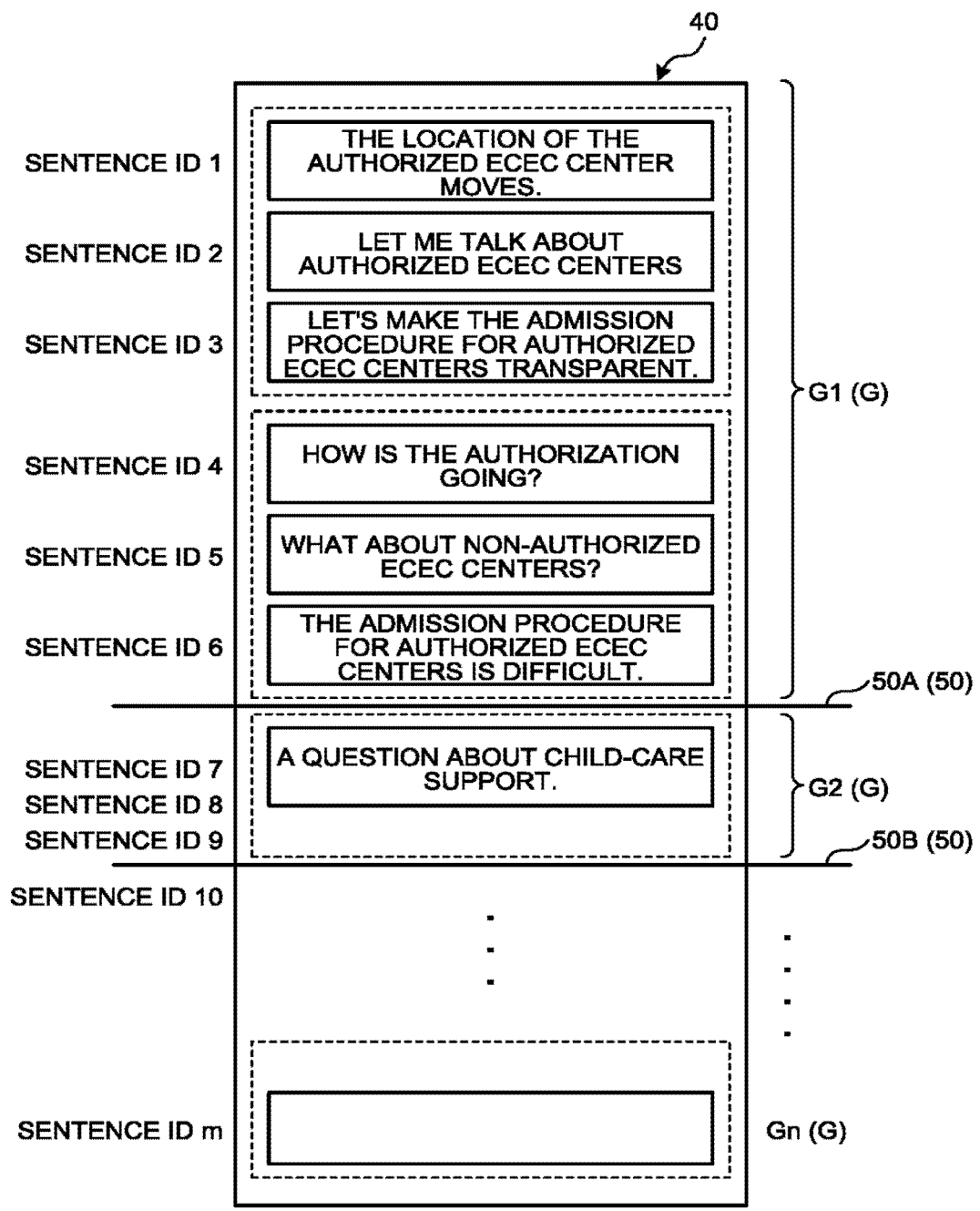

TOPIC-IDENTIFYING INFORMATION PROCESSING DEVICE, TOPIC-IDENTIFYING INFORMATION PROCESSING METHOD, AND TOPIC-IDENTIFYING COMPUTER PROGRAM PRODUCT

CROSS-REFERENCE TO RELATED APPLICATION

This application is a continuation of PCT International Application Ser. No. PCT/JP2017/034583 filed on Sep. 25, 2017, which claims the benefit of priority from Japanese Patent Application No. 2016-240931, filed on Dec. 13, 2016, and which designates the United States, the entire contents of which are incorporated herein by reference.

FIELD

Embodiments described herein relate generally to an information processing device, an information processing method, and a computer program product.

BACKGROUND

With the recent advancement in information systems, documents, such as patent documents, newspaper articles, web pages, and books, and data, such as videos and sounds, can be accumulated. Demands are placed on technologies enabling easy understanding of these contents of data.

As one of such technologies, a technology has been developed to extract words with a speech density per unit time exceeding a predetermined value as topic words in the unit time from among all words included in text data. The conventional technology, however, extracts words with a high speech density as topic words for each unit time. As a result, in the conventional technology, topic names are assigned in narrower units than those of actual topics, and words indicating narrower meanings than those of the actual topics are assigned as the topic names. Conventional technologies are described in Japanese Patent Application Laid-open No. 2008-9552, for example.

BRIEF DESCRIPTION OF THE DRAWINGS

FIG. 2 is a schematic diagram illustrating an example of a display screen displayed on a terminal during voice recording;

FIG. 3 is a schematic diagram illustrating an example of a data configuration of a history management database (DB);

FIG. 4 is a schematic diagram illustrating an example of a data configuration of a supervised topic list;

FIG. 5 is an explanatory diagram illustrating an example of calculation of topic vectors;

FIG. 6 is a schematic diagram illustrating another example of the calculation of the topic vectors;

FIG. 7 is a schematic diagram illustrating an example of similarity calculation;

FIG. 8 is an explanatory diagram of an example of division into groups;

DETAILED DESCRIPTION

According to an embodiment, an information processing device includes a divider and an identifier. The divider divides a plurality of sentences included in a processing target sentence set into a plurality of groups based on a supervised topic list representing a list of supervised topic name that is set in advance. The identifier identifies a topic name for each of the groups based on the supervised topic list.

The following describes an embodiment of an information processing device, an information processing method, and a computer program product in detail with reference to the accompanying drawings.

Figure 1:
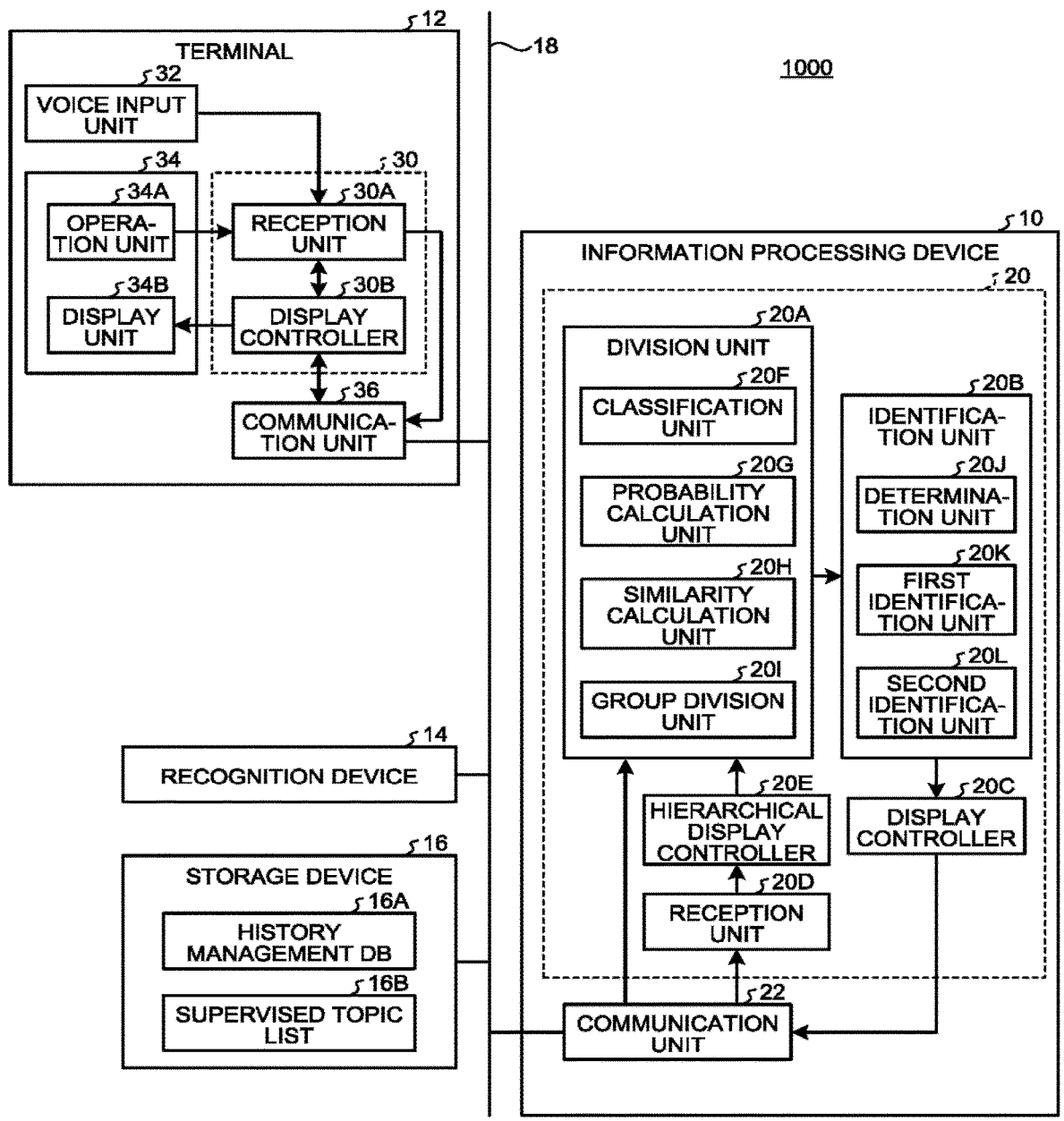
FIG. 1 is a schematic diagram illustrating an example of an information processing system according to an embodiment.

FIG. 1 is a schematic diagram illustrating an example of an information processing system 1000 according to the present embodiment.

The information processing system 1000 according to the present embodiment is provided with an information processing device 10, a terminal 12, a recognition device 14, and a storage device 16. The information processing device 10, the terminal 12, the recognition device 14, and the storage device 16 are connected so as to be communicable with one another through a network 18.

The network 18 is, for example, a local area network (LAN) and/or the Internet. The form of the network 18 is not limited to these examples, and can be any network form.

At least one of the information processing device 10, the terminal 12, the recognition device 14, and the storage device 16 is wirelessly or wiredly connected to the network 18. In the case of the wireless connection, for example, a third generation (3G) line, a wireless LAN, or Bluetooth (registered trademark) may be used.

FIG. 1 illustrates a case where the information processing device 10, the terminal 12, the recognition device 14, and the storage device 16 are configured as separate components. However, at least two or more of the information processing device 10, the terminal 12, the recognition device 14, and the storage device 16 may be configured as one device.

At least some of the respective functions of the information processing device 10, the terminal 12, the recognition device 14, and the storage device 16 may be provided in another device. Some or all of the respective functions of the information processing device 10, the terminal 12, the recognition device 14, and the storage device 16 may be provided in one apparatus.

The terminal 12 will first be described. The terminal 12 is a terminal device operated by a user. The terminal 12 is, for example, a smartphone, a tablet computer, or a personal computer (PC).

The terminal 12 is provided with a controller 30, a voice input unit 32, an operation panel 34, and a communication unit 36. The voice input unit 32, the operation panel 34, and the communication unit 36 are connected to the controller 30.

The voice input unit 32 receives, for example, a voice uttered by the user. The voice input unit 32 is, for example, a microphone.

The operation panel 34 receives various types of operation input corresponding to operations by the user, and displays various types of information and various images.

In the embodiment, a case will be described where the operation panel 34 is a touchscreen panel integrally including both an operation unit 34A and a display unit 34B. The operation unit 34A performs the reception function of receiving the various types of operation input. The display unit 34B performs the display function of displaying the various types of information. The configuration of the operation panel 34 is not limited to such a configuration. For example, the operation panel 34 may include the operation unit 34A and the display unit 34B as separate components.

The communication unit 36 communicates with other devices through the network 18.

The controller 30 controls the terminal 12. The controller 30 includes a reception unit 30A and a display controller 30B. One or both of the reception unit 30A and the display controller 30B may be implemented, for example, by causing a processing device, such as a central processing unit (CPU), to execute a program (that is, software), or may be implemented as hardware, such as an integrated circuit (IC), or may be implemented by using both hardware and software.

The reception unit 30A receives a signal indicated by an operational instruction for the operation unit 34A given by the user. The display controller 30B controls display processing to the display unit 34B. For example, the display controller 30B performs control to display the various images, such as those on a display screen, on the display unit 34B.

For example, the user instructs, via the display screen displayed on the display unit 34B, to start recording a voice and end recording the voice. FIG. 2 is a schematic diagram illustrating an example of a display screen 38 displayed on the terminal 12 during the voice recording.

The display screen 38 is displayed on the operation panel 34 of the terminal 12. The display screen 38 includes a display area 38A for indicating a recognition result of the voice, a recording start button 38B, a recording end button 38C, and a play button 38D.

For example, the user presses the recording start button 38B on the display screen 38. In response, the reception unit 30A controls the voice input unit 32 so as to start voice input, and receives the voice from the voice input unit 32. After the recording start button 38B is pressed, the display controller 30B displays, on the display screen 38, the recording end button 38C instead of the recording start button 38B. Then, the reception unit 30A continues receiving the voice until the recording end button 38C is pressed by the user. The communication unit 36 of the terminal 12 outputs the voice received during a period from when the recording start button 38B is pressed until the recording end button 38C is pressed, as one audio file, to the recognition device 14. The display area 38A of the display screen 38 displays, for example, a sentence that is the recognition result of the audio file.

The description will be continued with reference again to FIG. 1. The following describes the recognition device 14. The recognition device 14 recognizes the voice, and outputs text data representing the recognition result. For example, the recognition device 14 receives the audio file of the voice recorded by the voice input unit 32 of the terminal 12. Then, the recognition device 14 analyzes the audio file to convert the voice included in the audio file into a text (sentence), thus obtaining the text data.

The text data is a set of a plurality of sentences. The set of a plurality of sentences will be described by being referred to as a sentence set. In other words, the sentence set includes a plurality of sentences. One or a plurality of sentences obtained by the recognition device 14 is or are stored in the storage device 16.

The following describes the storage device 16. The storage device 16 is provided with a storage unit for storing therein the various types of information. The storage device 16 is referred to as a file server or a cloud server in some cases. The storage unit of the storage device 16 can be constituted by any generally used storage medium, such as a hard disk drive (HDD), an optical disc, a memory card, or a random access memory (RAM).

In the present embodiment, the storage device 16 stores therein a history management DB 16A and a supervised topic list 16B.

FIG. 3 is a schematic diagram illustrating an example of the data configuration of the history management DB 16A. The history management DB 16A is a database for managing the sentence set. The data form of the history management DB 16A is not limited to a database.

For example, the history management DB 16A associates a file, sentence identifiers (IDs) of sentences included in the file, the sentences, speech timing, and morphemes with one another. The history management DB 16A only needs to be at least a database that registers a plurality of sentences to be processed by the information processing device 10 to be described later.

The file is a file from which the sentences registered with the history management DB 16A are recognized. In other words, the file is, for example, the audio file or a document file.

The sentence IDs are identification information on the sentences. The speech timing is information indicating relative positions of the sentences in the corresponding file. For example, the speech timing indicates, for example, timing when voices representing corresponding sentences are uttered, or positions (for example, positions specified by rows and columns) in the corresponding file. The morphemes are morphemes included in corresponding sentences.

For example, the recognition device 14 stores the audio file received from the terminal 12, the recognized sentences included in the audio file, the speech timing of the sentences, and the morphemes included in the sentences in a mutually associated manner in the history management DB 16A. The recognition device 14 also assigns the sentence IDs to the respective sentences registered with the history management DB 16A, and registers the sentence IDs in the history management DB 16A.

In the case of registering the document file with the history management DB 16A, for example, a controller of the storage device 16 only needs to analyze the document file using a known method, and register the sentence IDs, the speech timing, the sentences, and the morphemes in a mutually associated manner in the history management DB 16A. In this case, the positions of the respective sentences in the document file only need to be used as the speech timing.

A known morphological analysis only needs to be used as a method for analyzing the morphemes. The analysis of the morphemes and the registration thereof in the history management DB 16A may be performed by any of the recognition device 14, the storage device 16, and the information processing device 10, which is to be described later.

The following describes the supervised topic list 16B stored in the storage device 16. FIG. 4 is a schematic diagram illustrating an example of the data configuration of the supervised topic list 16B.

The supervised topic list 16B represents a list of supervised topic name that is set in advance. The term "supervised topic name" represents a topic name assumed and set in advance. The supervised topic name may be referred to as a supervised topic name.

For example, the supervised topic list 16B associates the supervised topic names with sentences and/or words. The sentences and/or words associated with the supervised topic names refer to sentences (texts) or words belonging to topics having the corresponding supervised topic names. In other words, each of the supervised topic names in the supervised topic list 16B is a name of a topic defined by the corresponding sentences and/or words, and is set and assumed in advance.

In this specification, the term "the sentence set" refers to the set of a plurality of sentences. In other words, the sentence set includes a plurality of sentences, as described above. The sentence is a grammatical linguistic unit, and is a set of clustered series of words written in characters. Each of the sentences is constituted by a plurality of morphemes. Each of the words is a free morpheme among the morphemes. The free morpheme is a morpheme that can form a word by itself without being concatenated with other morphemes. Each of the supervised topic names and the topic names is a type of word, and can be said to be a word selected as the supervised topic name or the topic name.

The supervised topic list 16B is set in advance. The supervised topic list 16B may be changeable by, for example, an operational instruction given by the user. In the present embodiment, as an example, a case will be described where the storage device 16 stores therein in advance one supervised topic list 16B. The storage device 16 may, however, store therein in advance one or more supervised topic lists 16B for each predetermined field. In this case, the storage device 16 only needs to store therein identification information on the fields (field IDs) and the supervised topic lists 16B in a mutually associated manner.

The description will be continued with reference again to FIG. 1. The following describes the information processing device 10. The information processing device 10 identifies the topic name for each divided group of a processing target sentence set (to be described in detail later).

As illustrated in FIG. 1, the information processing device 10 is provided with a controller 20 and a communication unit 22. The communication unit 22 communicates with the terminal 12, the recognition device 14, and the storage device 16 through the network 18. The communication unit 22 is connected to the controller 20.

The controller 20 controls the information processing device 10. The controller 20 is provided with a division unit 20A, an identification unit 20B, a display controller 20C, a reception unit 20D, and a hierarchical display controller 20E. The division unit 20A includes a classification unit 20F, a probability calculation unit 20G, a similarity calculation unit 20H, and a group division unit 20I. The identification unit 20B includes a determination unit 20J, a first identification unit 20K, and a second identification unit 20L.

Some or all of the division unit 20A, the identification unit 20B, the display controller 20C, the reception unit 20D, the hierarchical display controller 20E, the classification unit 20F, the probability calculation unit 20G, the similarity calculation unit 20H, the group division unit 20I, the determination unit 20J, the first identification unit 20K, and the second identification unit 20L may be implemented, for example, by causing a processing device, such as a CPU, to execute a program (that is, software), or may be implemented as hardware, such as an integrated circuit (IC), or may be implemented by using both hardware and software.

The division unit 20A divides the sentences included in the processing target sentence set into a plurality of groups based on the supervised topic list 16B. In the present embodiment, the division unit 20A arranges the sentences included in the processing target sentence set in the order of the speech timing. The division unit 20A provides a delimiting position in at least a position between sentences based on the supervised topic list 16B. Thus, the division unit 20A divides the processing target sentence set into the groups delimited at the delimiting positions.

Detailed description will be made below. First, the division unit 20A acquires the processing target sentence set. The term "processing target sentence set" refers to a plurality of sentences in a processing target range. In other words, the term "processing target sentence set" refers to a sentence set for which the topic names are to be identified. The processing target range only needs to be indicated by information that can identify processing target sentences. For example, the processing target range is information indicating, for example, a specific period of the speech timing or a specific region in the document file. In more detail, the processing target range is expressed by, for example, a specific year, a specific month, a specific month of a specific year, a specific day, a specific date, or a specific time zone on a specific day.

The division unit 20A reads the processing target sentences from the history management DB 16A to acquire the processing target sentence set. For example, the division unit 20A reads a plurality of sentences uttered in a certain period from the history management DB 16A to acquire the processing target sentence set.

The processing target range may be set in advance, or may be changeable by an operational instruction given by the user. The user of the terminal 12 may operate the operation panel 34 of the terminal 12 to enter the processing target range. In this case, the division unit 20A of the information processing device 10 only needs to receive the processing target range from the terminal 12 and read a plurality of sentences in the processing target range from the history management DB 16A to acquire the processing target sentence set.

The division unit 20A then divides the sentences included in the processing target sentence set into the groups.

The division unit 20A divides the sentences included in the processing target sentence set into the groups based on the supervised topic list 16B. Using the supervised topic list 16B, the division unit 20A can divide the sentences included in the sentence set into sections of topics according to the supervised topic names registered with the supervised topic list 16B.

In the present embodiment, the division unit 20A includes the classification unit 20F, the probability calculation unit 20G, the similarity calculation unit 20H, and the group division unit 20I.

The classification unit 20F classifies the words included in the processing target sentence set into a plurality of topic categories. The classification unit 20F extracts all the words included in each of the sentences constituting the processing target sentence set, and classifies the extracted words into the topic categories.

The term "topic category" refers to a category including words with high possibility of having the same topic. The classification unit 20F uses a known method to classify the words included in the processing target sentence set into the topic categories. The classification unit 20F uses, for example, latent Dirichlet allocation (LDA) to classify the words included in the processing target sentence set into the topic categories.

The LDA is a method that extracts a specified number of topic categories from the sentence set, and derives a probability that a word included in the sentence set belong to a topic category and a probability that the topic category belongs to the sentences included in the sentence set (refer, for example, to Reference Literature 1) (Reference Literature 1: David M. Blei, Andrew Y. Ng, Michael I. Jordan, Latent Dirichlet Allocation, Journal of Machine Learning Research, Vol. 3, pp. 993-1022, 2003).

In the present embodiment, the classification unit 20F will be described to assign the identification information (a topic category 1 to a topic category M (where M is an integer of two or greater)) to each topic category and use the identification information in later processing.

The probability calculation unit 20G calculates a topic vector for each of the sentences included in the processing target sentence set. The topic vector represents probabilities that each of the topic categories classified by the classification unit 20F belongs to the sentences included in the sentence set. In the present embodiment, when the probability calculation unit 20G calculates, based on the supervised topic list 16B, the probabilities that each of the topic categories belongs to the sentences, the probability calculation unit 20G calculates the topic vector for each of the sentences such that the probability that each of the topic categories corresponding to the supervised topic names presented in the supervised topic list 16B belongs to the sentences is higher than an actual probability. The term "actual probability" refers to the probability that each of the topic categories belongs to the topic vector, and refers to the probability without weighting or the like according to any kind of element (herein, the supervised topic name).

This magnifying rate (that is, a weighting value) only needs to be set in advance. The weighting value may be appropriately adjustable by, for example, an operational instruction for the terminal 12 given by the user. Adjusting the weighting value allows the division into the groups to be performed along the sections of topics according to the supervised topic names registered with the supervised topic list 16B.

FIG. 5 is an explanatory diagram illustrating an example of the calculation of the topic vectors. The top diagram in FIG. 5 is a schematic diagram illustrating an example of a processing target sentence set 40. For example, the sentence set 40 is assumed to include a plurality of sentences corresponding to a sentence ID 1 to a sentence ID m (where m is an integer of two or greater).

In this case, as illustrated, for example, in the second diagram in FIG. 5, the classification unit 20F classifies a plurality of words included in the sentence set 40 into a plurality of categories of the topic categories 1 to M. A word belonging probability 43 represents the probability that each of the words included in the processing target sentence set belongs to topic categories.

Then, the probability calculation unit 20G calculates the word belonging probability 43 for each of the topic categories 1 to M classified by the classification unit 20F (refer to the second diagram in FIG. 5). The word belonging probability 43 represents the probability that each of the words included in the processing target sentence set belongs to the topic categories.

The probability calculation unit 20G only needs to use LDA to calculate the word belonging probabilities 43 for the respective topic categories 1 to M.

The second diagram in FIG. 5 illustrates, as an example, an aspect where the probability calculation unit 20G has calculated word belonging probabilities $43_1$ to $43_4$ for the topic categories 1 to 4, respectively. The probability calculation unit 20G also calculates the word belonging probability 43 for each of the M topic categories, in the same way.

The probability calculation unit 20G then calculates a topic vector 41 for each of the sentences included in the processing target sentence set 40 (refer to the third diagram in FIG. 5).

As described above, the topic vector 41 represents the probabilities that the topic categories classified by the classification unit 20F belong to each of the sentences included in the processing target sentence set. In detail, as illustrated in the third diagram in FIG. 5, the topic vector 41 corresponding to each of the sentences is constituted by M elements, M being the number of the topic categories classified by the classification unit 20F. The value of each of the M elements indicated in the topic vector 41 is a value representing the probability that corresponding one of the topic categories belongs to the sentence.

The probability calculation unit 20G only needs to use the LDA to calculate the topic vector 41 for each of the sentences included in the processing target sentence set. In detail, the probability calculation unit 20G uses the LDA to calculate the topic vector 41 for each of the sentences included in the processing target sentence set based on the word belonging probabilities 43 of the respective topic categories.

The third diagram in FIG. 5 illustrates, as an example, the topic vectors 41 (topic vectors 41a to 41c) corresponding to the respective sentences identified by the sentence IDs 1 to 3. The probability calculation unit 20G also calculates the topic vector 41 for each of the other sentences included in the processing target sentence set, in the same way.

Here, for the topic categories corresponding to the supervised topic names registered with the supervised topic list 16B among the topic categories 1 to M classified by the classification unit 20F, the probability calculation unit 20G calculates the topic vector 41 such that the probabilities are higher than the actual probabilities. Probabilities calculated from the word belonging probabilities 43 only need to be used as the actual probabilities.

For example, the topic category 1 among the topic categories 1 to M is assumed to correspond to a supervised topic name "authorized center for early childhood education and care (ECEC center)" in the supervised topic list 16B. The topic category 2 is assumed to correspond to a supervised topic name "child-care support" in the supervised topic list 16B. The topic category 3 is assumed to correspond to a supervised topic name "birth" in the supervised topic list 16B. The topic category 4 is assumed to correspond to none of the supervised topics in the supervised topic list 16B.

In this case, the probability calculation unit 20G corrects the probabilities that the topic categories 1 to 3 corresponding to the supervised topic names "authorized ECEC center", "child-care support", and "birth" belong to the respective topic vectors 41 (topic vectors 41a to 41c) so as to increase these probabilities (refer to the fourth diagram in FIG. 5). The probability calculation unit 20G then calculates each of the topic vectors 41 (topic vectors 41a' to 41c') after being corrected as the topic vector 41 corresponding to each of the sentences.

To derive which of the supervised topic names in the supervised topic list 16B is associated with the topic categories 1 to M, a known method only needs to be used. For example, if a word listed among the sentences and/or words in the supervised topic list 16B belongs to a topic category among the topic categories 1 to M at a probability equal to or higher than a threshold, the probability calculation unit 20G identifies that the topic category corresponds to a supervised topic name corresponding to the word. If, in contrast, a word listed among the sentences and/or words in the supervised topic list 16B belongs to a topic category among the topic categories 1 to M at a probability lower than the threshold, the probability calculation unit 20G determines that no corresponding supervised topic name is present.

The probability calculation unit 20G may directly calculate the topic vector 41 with the probabilities of belonging of the topic categories corrected based on the supervised topic names, from the word belonging probabilities 43 of the respective topic categories 1 to M.

In this case, at the stage where the word belonging probabilities 43 of each of the topic categories have been calculated (refer to the second diagram in FIG. 5), the probability calculation unit 20G first identifies the supervised topic name corresponding to each of the topic categories. The above-described method only needs to be used to identify the supervised topic name corresponding to each of the topic categories. As described above, topic categories with no corresponding supervised topic name may be present in some cases.

Then, when the probability calculation unit 20G uses the LDA to calculate the topic vector 41 of each of the sentences from the word belonging probabilities 43 of the topic categories, the probability calculation unit 20G only needs to calculate the probabilities of belonging of the topic categories including the identified supervised topic names such that the calculated probabilities are higher than the actual probabilities.

For example, the probability calculation unit 20G uses LDA-Z (refer to Reference Literature 2) (Reference Literature 2: David Andrzejewski, Xiaojin Zhu, Latent Dirichlet Allocation with Topic-in-set Knowledge, in Proceedings of the NAACL HLT 2009 Workshop on Semi-Supervised Learning for Natural Language Processing, pp. 43-38, 2009). Using the LDA-Z, the probability calculation unit 20G can identify the supervised topic names corresponding to the topic categories 1 to M, and calculate the topic vectors 41 (topic vectors 41a' to 41c') after being corrected illustrated in the fourth diagram in FIG. 5.

In this case, the probability calculation unit 20G can calculate, for example, the topic vectors 41 (topic vectors 41a' to 41c') with the probabilities corrected based on the supervised topic names illustrated in the fourth diagram in FIG. 5, directly from the word belonging probabilities 43 of the respective topic categories illustrated in the second diagram in FIG. 5, without calculating the topic vectors 41 before being corrected illustrated in the third diagram in FIG. 5. In later processing, the controller 20 of the information processing device 10 uses the topic vectors 41 with the probabilities corrected based on the supervised topic names.

The description will be continued with reference again to FIG. 1. For the processing target sentence set, the similarity calculation unit 20H calculates the degree of similarity in probability of belonging of each of the topic categories between sentences adjacent in position in the sentence set. In other words, for the processing target sentence set, the similarity calculation unit 20H calculates the degree of similarity of the topic vectors 41 between the sentences adjacent in position.

The term "between sentences" refers to a pause between a sentence and a sentence adjacent in position in the sentence set.

The term "sentences adjacent in position in the sentence set" means that the relative positions in the processing target sentence set are adjacent. In other words, the term "adjacent in position in the sentence set" means that time points of speech timing are adjacent. As described above, the speech timing represents a time point when a voice corresponding to a sentence was produced and a writing position in a corresponding file. Therefore, if the speech timing represents the time point when the voice was produced, the sentence adjacent in position refers to a sentence adjacent in speech timing. If the speech timing represents the writing position in the corresponding file, the sentence adjacent in position refers to a sentence, the writing position of which in the file is adjacent along a write direction.

While the similarity calculation unit 20H may calculate the degree of similarity of the topic vectors 41 between the sentences, the similarity calculation unit 20H may cluster the sentences included in the processing target sentence set into groups of sentences (called sentence groups) each including a predetermined number of clustered sentences, and then, calculate the degree of similarity of the topic vectors 41 between the sentence groups.

Each of the sentence groups is made by device sentences included in the processing target sentence set for each predetermined number of clustered sentences along the write direction of the sentences or a direction representing the ascending order of the speech timing of the sentences.

In this case, the probability calculation unit 20G clusters the sentences included in the processing target sentence set into the sentence groups each including the predetermined number of clustered sentences, and then, calculates the topic vector 41 for each of the sentence groups. In other words, the probability calculation unit 20G clusters the topic vectors 41 corresponding to the respective sentences included in a sentence group into one, and thus calculates one topic vector 41 for each of the sentence groups.

The number of clustered sentences only needs to be an integer of one or greater. The number of clustered sentences is, for example, set in advance by the user. The probability calculation unit 20G may calculate the number of clustered sentences according to the number of sentences included in the processing target sentence set. For example, the probability calculation unit 20G calculates the number of clustered sentences within a range of an integer equal to or greater than one and smaller than the number of sentences included in the processing target sentence set. Specifically, for example, the probability calculation unit 20G sets the maximum value of the number of clustered sentences smaller than half the number of sentences included in the processing target sentence set. The probability calculation unit 20G only needs to calculate the number of clustered sentences to be greater as the number of sentences included in the processing target sentence set increases.

The probability calculation unit 20G calculates the topic vector 41 corresponding to the sentence group. In other words, the probability calculation unit 20G calculates one topic vector 41 for each of the sentence groups.

FIG. 6 is a schematic diagram illustrating an example of the calculation of the topic vectors 41 for the respective sentence groups when the number of clustered sentences is "3".

The left diagram in FIG. 6 is a schematic diagram illustrating an example of the processing target sentence set 40. For example, the processing target sentence set 40 is assumed to be constituted by the sentences identified by the respective sentence IDs 1 to m. The sentences included in the processing target sentence set 40 are assumed to be arranged in ascending order along the speech timing (along the write direction if the file from which the sentences have been recognized is a document file).

In this case, the probability calculation unit 20G first clusters the sentences constituting the sentence set 40 into groups each including three sentences according to the number of clustered sentences of "3", and thus identifies the sentence groups. The similarity calculation unit 20H treats, for example, three sentences identified by the sentence IDs 1 to 3 as one sentence group. The probability calculation unit 20G also clusters sentences identified by the sentence IDs 4 to m into groups each including three sentences according to the number of clustered sentences of "3", and thus identifies the sentence groups.

Then, the probability calculation unit 20G clusters the topic vectors 41 of the respective sentences belonging to each of the sentence groups into one, and thus calculates the topic vector 41 corresponding to the sentence group.

In detail, the probability calculation unit 20G identifies the topic vectors 41 (topic vectors $41a'$ to $41c'$) of the respective sentences belonging to the sentence group constituted by three sentences of the sentence IDs 1 to 3. The topic vectors $41a'$ to $41c'$ are the topic vectors 41 (topic vectors $41a'$ to $41c'$) illustrated in the fourth diagram in FIG. 5 with the probabilities corrected based on the supervised topic names.

Then, for each of the topic vectors 41 (topic vectors $41a'$ to $41c'$) corresponding to the respective sentences belonging to the sentence group, the probability calculation unit 20G divides the probability of belonging of each of the topic categories by the maximum value of the probabilities of belonging of the topic categories to the topic vectors. By performing this operation, the probability calculation unit 20G normalizes the probability of each of the topic categories indicated in the topic vector 41 corresponding to each of the sentences belonging to the sentence group to derive the topic vectors 41 (topic vectors $41a''$ to $41c''$).

Then, for the normalized topic vectors 41 (topic vectors $41a''$ to $41c''$) of the respective sentences belonging to the sentence group, the probability calculation unit 20G calculates the total value of the probabilities of belonging of each of the topic categories. By performing this operation, the probability calculation unit 20G calculates the topic vectors 41 corresponding to the sentence group. FIG. 6 illustrates a topic vector 41A as the topic vector 41 corresponding to the sentence group constituted by the sentences of the sentence IDs 1 to 3.

In the same manner for the other sentence groups, the probability calculation unit 20G calculates the topic vector 41 corresponding to each of the sentence groups.

Then, the similarity calculation unit 20H calculates the degree of similarity of the topic vectors 41 between the sentences included in the processing target sentence set. In the present embodiment, the similarity calculation unit 20H calculates the degree of similarity of the topic vectors 41 between the sentence groups clustered for each number of clustered sentences included in the processing target sentence set.

FIG. 7 is a schematic diagram illustrating an example of the similarity calculation. The left diagram in FIG. 7 is a schematic diagram illustrating an example of the processing target sentence set 40. The left diagram in FIG. 7 is the same as the left diagram in FIG. 6.

The probability calculation unit 20G is assumed to have performed the above-described processing to calculate the topic vector 41A as the topic vector 41 corresponding to the sentence group of the sentences of the sentence IDs 1 to 3. The probability calculation unit 20G is assumed to have calculated a topic vector 41B as the topic vector 41 corresponding to the sentence group of the sentences of the sentence IDs 4 to 6. The probability calculation unit 20G is assumed to have calculated a topic vector 41C as the topic vector 41 corresponding to the sentence IDs 7 to 9. In the same manner for the other sentence groups, the probability calculation unit 20G has calculated the corresponding topic vectors 41.

In this case, the similarity calculation unit 20H calculates the degree of similarity of the topic vectors 41 between adjacent sentence groups. Specifically, the similarity calculation unit 20H calculates the degree of similarity between the topic vector 41A and the topic vector 41B. In the same way, the similarity calculation unit 20H calculates the degree of similarity between the topic vector 41B and the topic vector 41C, and the degrees of similarity of the topic vectors 41 between the other adjacent sentence groups.

The similarity calculation unit 20H calculates a cosine distance (cosine similarity) of a vector representing the probability of belonging of the same topic category, as a degree of similarity between two of the topic vectors 41 corresponding to two respective adjacent sentence groups.

As described above, for the processing target sentence set, the similarity calculation unit 20H may calculate the degree of similarity of the topic vectors 41 between the sentences adjacent in position in the sentence set. However, the degree of similarity of the topic vectors 41 is preferably calculated between the sentence groups obtained by device the sentences arranged along the speech timing in the sentence set according to the number of clustered sentences.

In ordinary conversations and documents, the same topic often continues for a certain period. As a result, the degree of similarity of the topic vectors 41 between sentences is often lower than the degree of similarity of the topic vectors 41 between sentence groups. While details will be described later, in the present embodiment, the group division unit 20I divides a plurality of sentences included in the sentence set into a plurality of groups according to the degree of similarity.

Therefore, since the similarity calculation unit 20H calculates the degree of similarity of the topic vectors 41 between the sentence groups clustered according to the number of clustered sentences, the group division unit 20I can divide the sentence set into groups each including more sentences. The information processing device 10 can achieve a higher information processing rate and a lower processing load.

The description will be continued with reference again to FIG. 1. The following describes the group division unit 20I. The group division unit 20I divides the sentences included in the processing target sentence set into the groups according to the degree of similarity.

In detail, the group division unit 20I divides the sentences included in the processing target sentence set into a plurality of (K) groups, using, as the delimiting positions, the number of (K−1) positions indicating degrees of similarity between sentences determined in advance in ascending order from among a plurality of degrees of similarity calculated by the similarity calculation unit 20H.

The number of the delimiting positions, K−1, only needs to be determined in advance. For example, the number of the delimiting positions, K−1, only needs to be determined in advance according to the number of the sentences included in the processing target sentence set, in the same way as the number of clustered sentences described above. The number of the delimiting positions may be appropriately changeable according to, for example, an operational instruction for the terminal 12 given by the user.

The group division unit 20I may calculate the number of the delimiting positions, K−1, according to the number of the sentences included in the processing target sentence set, and use the number to divide the sentences into groups. In this case, the group division unit 20I only needs to calculate the number of the delimiting positions, in the same way as the calculation of the number of clustered sentences described above.

The group division unit 20I may use positions between sentences indicating degrees of similarity therebetween equal to or lower than a threshold among the degrees of similarity calculated by the similarity calculation unit 20H as the delimiting positions to divide the sentences included in the sentence set into a plurality of groups. This threshold only needs to be set in advance. This threshold may be appropriately changeable according to, for example, an operational instruction for the terminal 12 given by the user.

FIG. 8 is an explanatory diagram of an example of division into groups G. For example, the processing target sentence set 40 is assumed to be the sentence set 40 illustrated in FIG. 8. The sentence set 40 illustrated in FIG. 8 is the same as that of the left diagram in FIG. 6 and the left diagram in FIG. 7.

The group division unit 20I is assumed to identify, for example, a position between the sentence IDs 6 and 7 and a position between the sentence IDs 9 and 10 as delimiting positions 50 (a delimiting position 50A and a delimiting position 50B) according to the degrees of similarity. In this case, the group division unit 20I uses the delimiting positions 50 as boundaries to divide the sentences included in the sentence set 40 into the groups G (groups G1 to Gn (where n is an integer of two or greater)).

The division unit 20A performs the above-described processing to divide the sentences included in the processing target sentence set 40 into the groups G.

The description will be continued with reference again to FIG. 1. The following describes the identification unit 20B.

The identification unit 20B identifies a topic name for each of the groups G divided by the division unit 20A based on the words included in the sentences included in the groups G and the supervised topic list 16B.

In the present embodiment, the identification unit 20B includes the determination unit 20J, the first identification unit 20K, and the second identification unit 20L.

The determination unit 20J determines, for each of the groups G, whether a topic category with the maximum belonging probability corresponds to any of the supervised topic names in the supervised topic list 16B.

The group G includes a plurality of sentences. Accordingly, in the same way as the calculation of the topic vectors 41 corresponding to the sentence groups by the similarity calculation unit 20H, the determination unit 20J clusters the topic vectors 41 of the respective sentences included in the group G into one for each of the groups G. In other words, the determination unit 20J clusters the topic vectors 41 of the respective sentences belonging to the group G into one so as to obtain one topic vector 41 for each of the groups G.

Then, for the topic vector 41 clustered into one corresponding to each of the groups G, the determination unit 20J determines whether any one of the included topic categories with the maximum belonging probability corresponds to any of the supervised topic names.

The determination unit 20J only needs to determine whether the topic category corresponds to any one of the supervised topic names, in the same way as the probability calculation unit 20G.

In some cases, the probability calculation unit 20G may have already identified the corresponding supervised topic name for each of the topic categories 1 to M. In such cases, the determination unit 20J only needs to acquire the supervised topic name corresponding to the topic category belonging with the maximum belonging probability in the groups G from the probability calculation unit 20G.

For the group G determined to correspond to any one of the supervised topic names by the determination unit 20J, the first identification unit 20K identifies the supervised topic name determined to correspond to the group G as the topic name.

For example, the topic category with the maximum belonging probability in the group G1 is assumed to be the topic category 1. The determination unit 20J is assumed to determine the supervised topic name corresponding to the topic category 1 to be the supervised topic name "authorized ECEC center" in the supervised topic list 16B. In this case, the first identification unit 20K identifies the topic name of the group G1 as "authorized ECEC center". For example, the topic category with the maximum belonging probability in the group G2 is assumed to be the topic category 2. The determination unit 20J is assumed to determine the supervised topic name corresponding to the topic category 2 to be the supervised topic name "child-care support" in the supervised topic list 16B. In this case, the first identification unit 20K identifies the topic name of the group G2 as "child-care support".

For any of the groups G determined to not correspond to any one of the supervised topic names by the determination unit 20J, the second identification unit 20L identifies, as the topic name, a word belonging to the group G with the maximum belonging probability among the words included in the processing target sentence set 40.

For example, the topic category with the maximum belonging probability in the group G3 is assumed to be determined to not correspond to any one of the supervised topic names. In this case, the second identification unit 20L identifies, as the topic name, a word (for example, "greetings") belonging to the group G3 with the maximum belonging probability among the words included in the processing target sentence set 40.

The display controller 20C displays the identified topic name for each of the groups G. In the present embodiment, the display controller 20C generates a display screen for indicating the identified topic name for each of the groups G, and displays the display screen on a display unit. The display unit for displaying the display screen may be a display unit provided on the information processing device 10 or the display unit 34B of the terminal 12. In the present embodiment, a case will be described as an example where the display controller 20C controls the display screen to be displayed on the display unit 34B of the terminal 12.

Figure 9A:
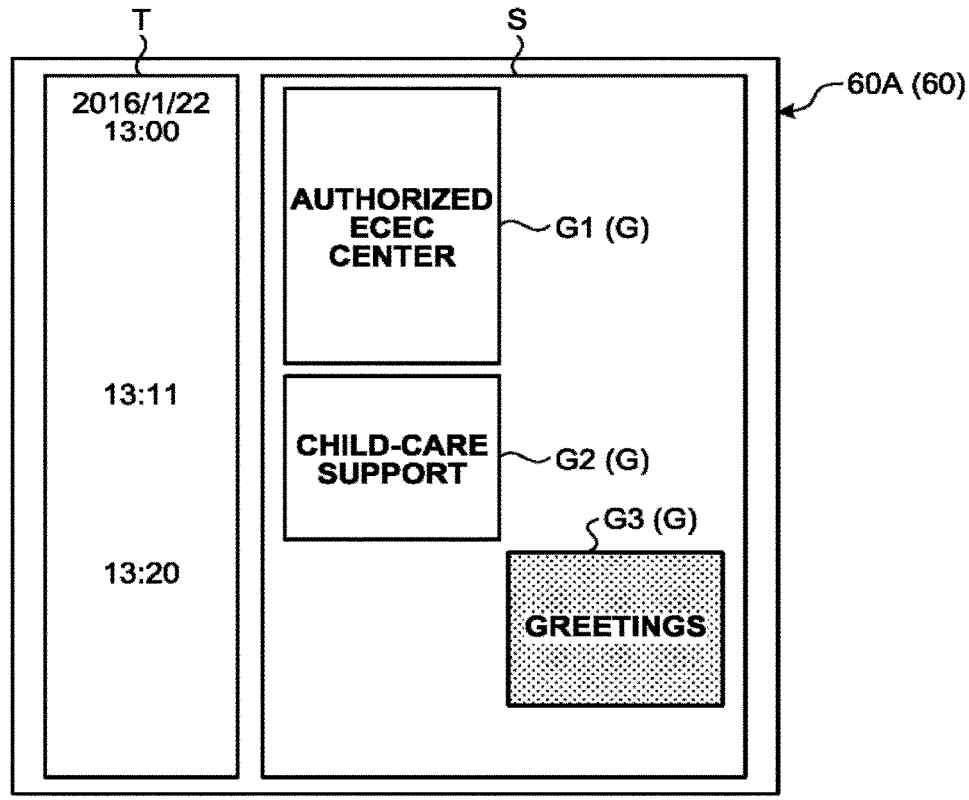
FIG. 9A is a schematic diagram illustrating an example of a display screen displayed by a display controller.
Figure 9B:
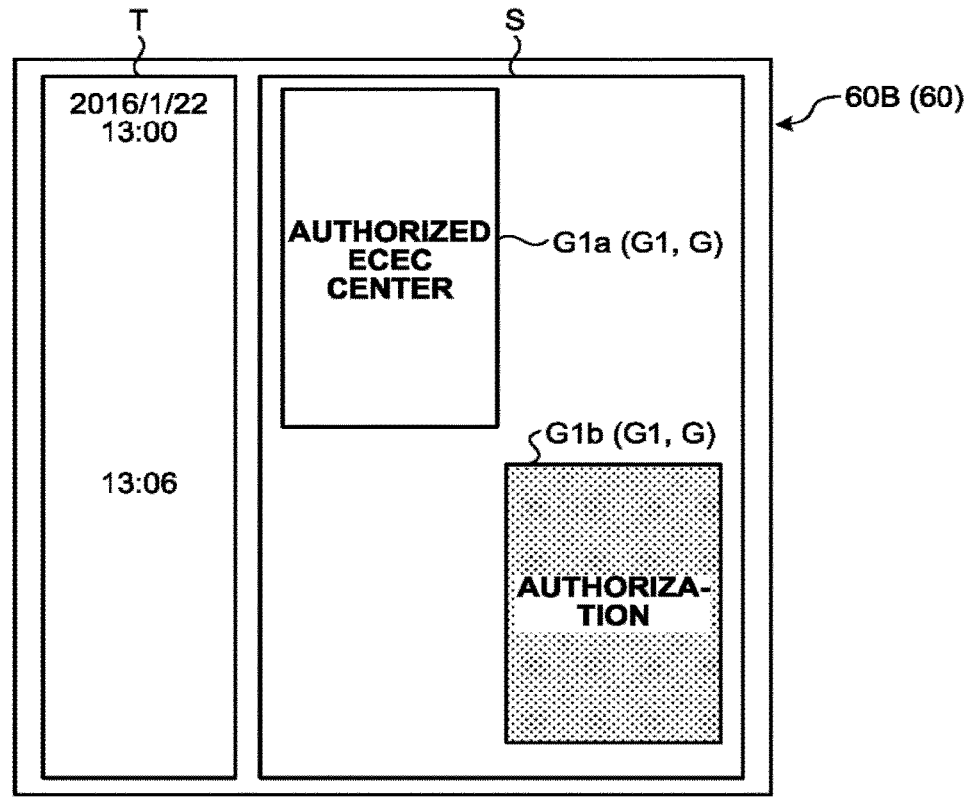
FIG. 9B is a schematic diagram illustrating another example of the display screen displayed by the display controller.

FIGS. 9A and 9B are schematic diagrams illustrating examples of a display screen 60 displayed by the display controller 20C.

For example, the display controller 20C generates a display screen 60A illustrated in FIG. 9A, and displays it on the display unit 34B. The display screen 60A includes a timeline display area T and a topic name display area S. The timeline display area T is a display area of a timeline corresponding to the speech timing of the sentences included in the processing target sentence set 40. The topic name display area S is a display area of the topic name of each of the groups G.

FIG. 9A illustrates an example in which the topic name "authorized ECEC center" of the group G1, the topic name "child-care support" of the group G2, and the topic name "greetings" of the group G3 are displayed in positions of the timeline display area T corresponding to the speech timing of the sentences included in the respective groups G in the topic name display area S. In this way, the display controller 20C displays the identified topic names for the respective groups G.

The display controller 20C preferably displays a topic name corresponding to the supervised topic name and a topic name not corresponding to the supervised topic name in different display modes for each of the groups G. The topic name corresponding to the supervised topic name is, for example, a topic name identical to the supervised topic name. The topic name not corresponding to the supervised topic name is, for example, a topic name not identical to the supervised topic name. Specifically, the topic name corresponding to the supervised topic name is a topic name identified by the first identification unit 20K, and the topic name not corresponding to the supervised topic name is a topic name identified by the second identification unit 20L.

The different display modes only need to be at least visually different modes, and refer to modes different in, for example, color, shape, and/or size.

Specifically, the group G1 and the group G2 are each assumed to have a topic name corresponding to the supervised topic name, and the group G3 is assumed to have a topic name not corresponding to the supervised topic name. In this case, as illustrated in FIG. 9A, the display controller 20C displays the topic names of the groups G1 and G2 ("authorized ECEC center" and "child-care support") corresponding to the supervised topic names thereof and the topic name of the group G3 "greetings" not corresponding to the supervised topic name thereof in display modes different from each other in position and color of the display area.

This representation allows the user viewing the displayed display screen 60 to easily understand the topic included in the processing target sentence set 40 for each section closer to that of the actual topic. The topic name identified for each of the groups G is not obtained by simply using words of each of the sentences included in the group G, but a topic name identified based on the supervised topic list 16B. Therefore, the user viewing the display screen 60 can intuitively understand the topic included in the processing target sentence set 40 in a short time.

The display controller 20C displays the topic name of the group G corresponding to the supervised topic name and the topic name of the group G not corresponding to the supervised topic name in different display modes. This representation allows the user viewing the display screen 60 to easily understand whether the topic represented by the displayed topic name is a topic represented by a supervised topic name registered with the supervised topic list 16B or a topic deviated from any of the topics represented by the supervised topic names.

The description will be continued with reference again to FIG. 1. In some cases, at least one of the topic names displayed for the respective groups G is specified on the display screen 60A displayed on the display unit 34B of the operation panel 34 (refer to FIG. 9A).

Accordingly, the information processing device 10 is provided with the reception unit 20D and the hierarchical display controller 20E. The reception unit 20D receives designation of one of the displayed topic names. For example, the display screen 60A (refer to FIG. 9A) is assumed to be displayed on the display unit 34B of the terminal 12. The user of the terminal 12 is assumed to operate the operation unit 34A to operationally specify one topic name on the display screen 60A. Accordingly, the reception unit 30A of the terminal 12 receives information indicating the operationally specified topic name, and transmits the information to the information processing device 10 via the communication unit 36. The reception unit 20D of the information processing device 10 receives the information via the communication unit 22 to receive the specified topic name.

In some cases, the information processing device 10 is provided with a display unit, on which the display screen 60A is displayed. In such cases, if one of the displayed topic names is specified by an operational instruction of the user operating the information processing device 10, the reception unit 20D of the information processing device 10 only needs to receive the designation from an operation unit of the information processing device 10.

The hierarchical display controller 20E controls the division unit 20A and the identification unit 20B so as to process the sentences belonging to one of the groups G corresponding to the topic name received by the reception unit 20D as the processing target sentence set.

As a result, the number of the sentences included in the processing target sentence set is reduced from that in the previous processing in the controller 20. Using the sentences belonging to one of the groups G corresponding to the specified topic name as a new processing target sentence set, the division unit 20A and the identification unit 20B perform the same processing as the above-described processing.

Since the use of the new set of sentences as the processing target sentence set changes, for example, the number of included sentences and the ratios of types of words included in the sentences, the word belonging probabilities 43 and the topic vectors 41 used by the division unit 20A and the identification unit 20B change from those used in the previous processing. Therefore, the division unit 20A and the identification unit 20B subdivide the sentence set of the sentences belonging to the specified one of the groups G into smaller groups G than those in the previous processing, and identify the topic names for the smaller groups G.

The display controller 20C performs the same processing on the topic names newly identified by the identification unit 20B. As a result, the display unit 34B displays the topic names of the new groups G obtained by subdividing (that is, by subdividing stepwise) the sentences belonging to the group G corresponding to the specified topic name.

In other words, at least one of the displayed topic names is specified as the processing target sentence set, and as a result, the hierarchical processing is performed by the division into the groups G subdivided stepwise from that in the previous processing, and identification of the topic names for the subdivided groups G.

FIG. 9B is a schematic diagram illustrating an example of a display screen 60B displayed on the display unit 34B after the display area of the topic name "authorized ECEC center" of the group G1 in FIG. 9A is specified and the designation of the topic name "authorized ECEC center" is received.

The hierarchical display controller 20E controls the division unit 20A and the identification unit 20B so as to process the sentences belonging to one of the groups G corresponding to the topic name received by the reception unit 20D as the processing target sentence set. As a result, the display unit 34B displays the display screen 60B. In the group G illustrated in the topic name display area S on the display screen 60B, the sentences belonging to the topic name "authorized ECEC center" of the group G1 (for example, the sentences identified by the sentence IDs 1 to 6) for which the designation has been received on the display screen 60A (FIG. 9A) are divided into a group G1a and a group G1b. The display screen 60B displays the topic name "authorized ECEC center" identified for the group G1a and a topic name "authorization" identified for the group G1b. The topic names are displayed in different display modes from each other depending on whether each of the topic names corresponds to a supervised topic name.

The following describes an example of a procedure of information processing performed by the information processing device 10.

Figure 10:
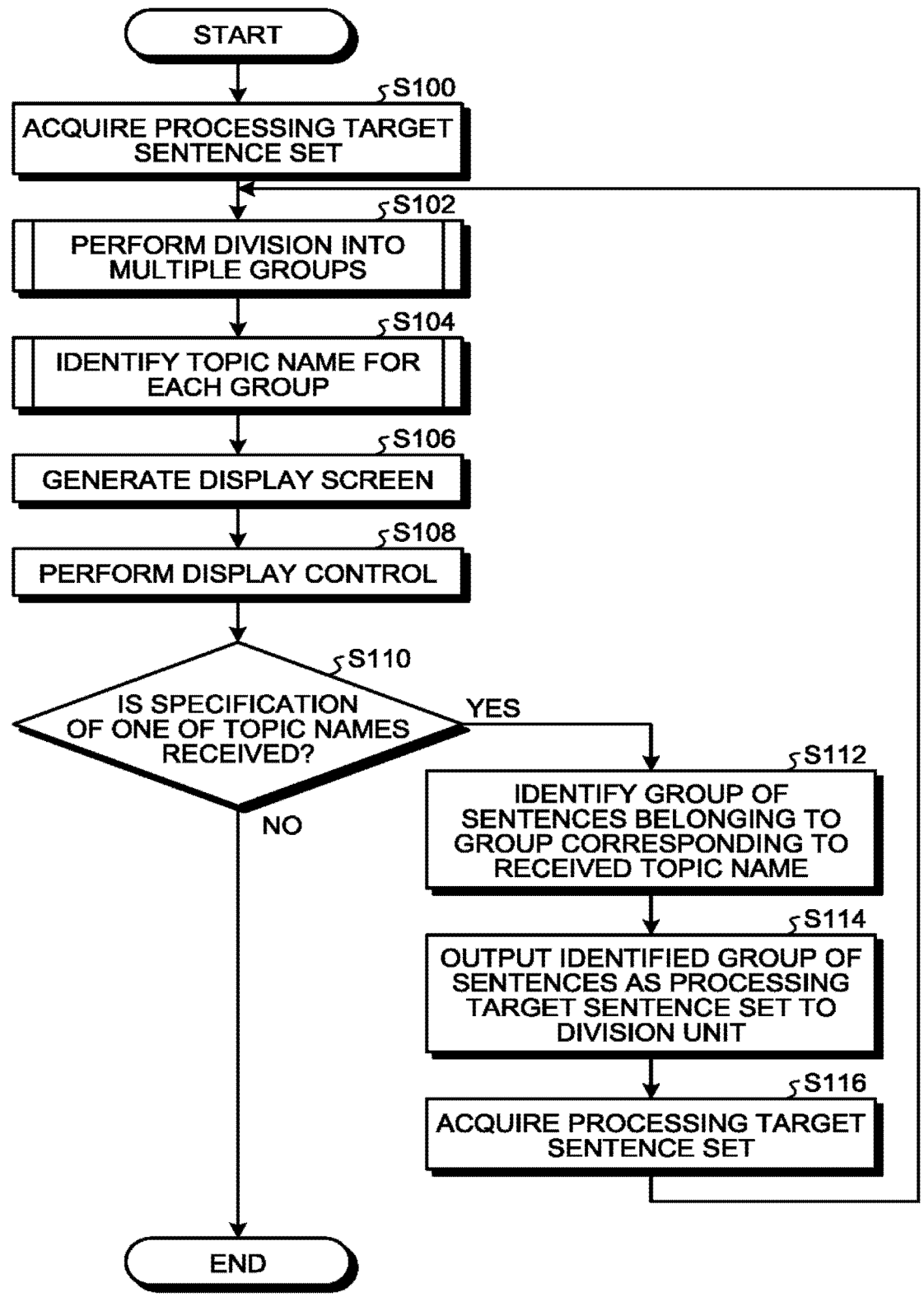
FIG. 10 is a flowchart illustrating an example of a procedure of information processing performed by an information processing device.

FIG. 10 is a flowchart illustrating the example of the procedure of the information processing performed by the information processing device 10.

First, the classification unit 20F acquires the processing target sentence set 40 (Step S100). For example, the classification unit 20F reads, from the history management DB 16A, a plurality of sentences in a processing target range specified by an operational instruction given by the user. By performing this operation, the classification unit 20F acquires the processing target sentence set 40.

Then, the division unit 20A performs division processing to divide the sentences included in the acquired processing target sentence set 40 into a plurality of groups G (Step S102). The division processing at Step S102 will be described in detail later.

Then, the identification unit 20B performs topic name identification processing to identify the topic name for each of the groups G divided at Step S102 (Step S104). The topic name identification processing at Step S104 will be described in detail later.

Then, the display controller 20C generates the display screen 60 for displaying the topic name identified at Step S104 for each of the groups G divided at Step S102 (Step S106) (refer to FIG. 9A). The display controller 20C then performs display control so as to display the display screen 60 (Step S108). For example, the display controller 20C performs the display control so as to display the display screen 60 generated at Step S106 on the display unit 34B of the terminal 12.

Then, a determination is made on whether the reception unit 20D has received designation of one of the topic names on the display screen 60 displayed at Step S108 (Step S110). If the determination is negative at Step S110 (No at Step S110), this routine ends.

If the determination is affirmative at Step S110 (Yes at Step S110), processing at Step S112 is performed. At Step S112, the hierarchical display controller 20E identifies a group of sentences belonging to one of the groups G corresponding to the received topic name (Step S112).

The hierarchical display controller 20E then outputs the identified group of sentences as the new processing target sentence set 40 to the division unit 20A (Step S114). By performing this operation, the division unit 20A newly acquires the processing target sentence set 40 (Step S116). Then, the process returns to Step S102 described above.

Figure 11:
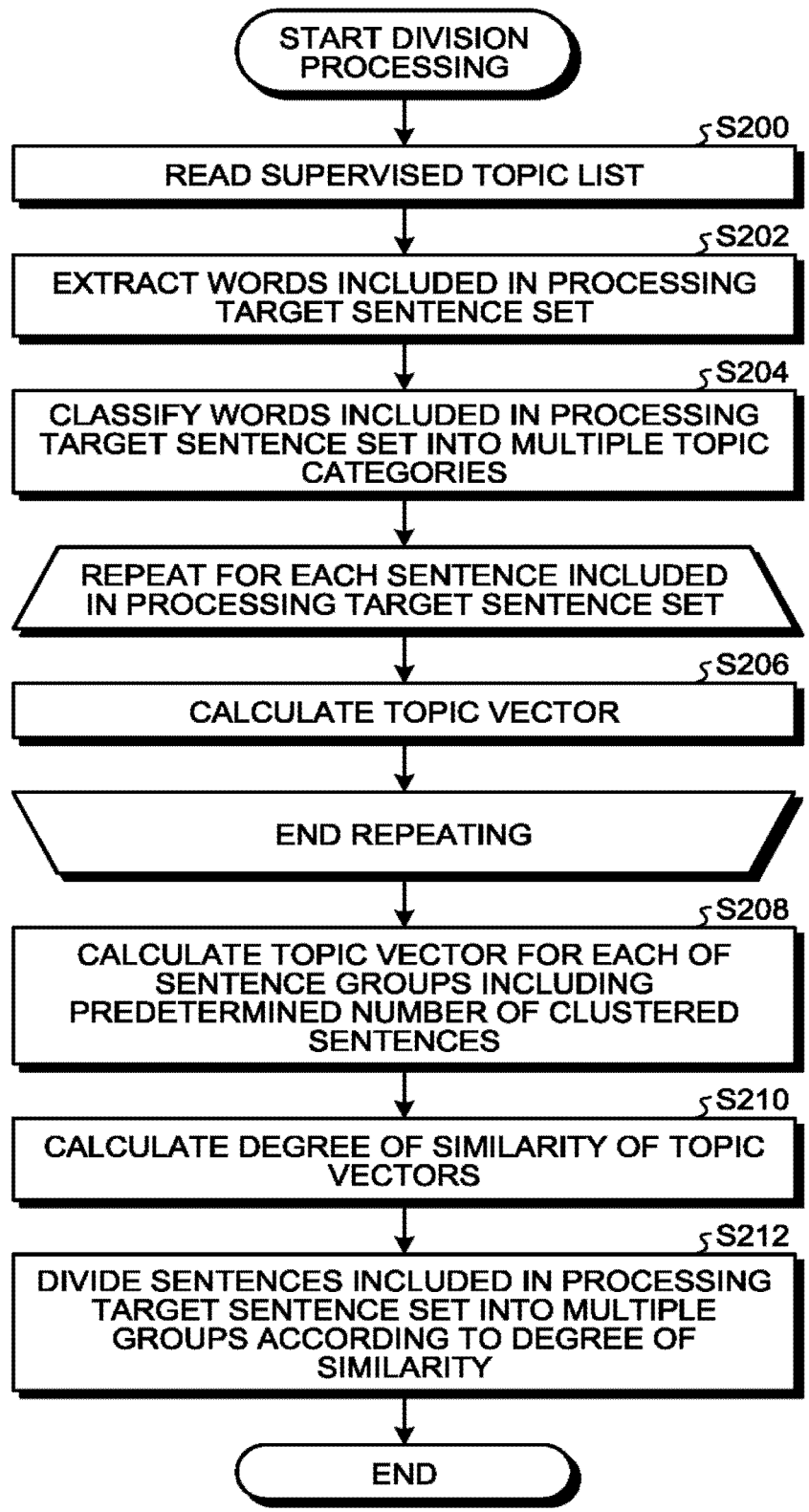
FIG. 11 is a flowchart illustrating an example of a procedure of division processing.

The following describes an example of a procedure of the division processing at Step S102 by the division unit 20A. FIG. 11 is a flowchart illustrating the example of the procedure of the division processing at Step S102 (refer to FIG. 10).

First, the classification unit 20F reads the supervised topic list 16B from the storage device 16 (Step S200). If the storage device 16 stores therein a plurality of supervised topic lists 16B, the classification unit 20F may read the supervised topic lists 16B from the storage device 16. The classification unit 20F may alternatively analyze the processing target sentence set 40 to identify one of the supervised topic lists 16B to be used for the processing, and read the identified supervised topic list 16B.

The classification unit 20F then extracts all the words included in each of the sentences constituting the processing target sentence set 40 (Step S202). The classification unit 20F then classifies the words extracted at Step S202 into a plurality of topic categories (Step S204).

Then, the probability calculation unit 20G performs the processing at Step S206 for each of the sentences included in the processing target sentence set 40. At Step S206, the probability calculation unit 20G calculates the topic vector 41 corresponding to each of the sentences (Step S206). At this step, the probability calculation unit 20G calculates the topic vectors 41 with the probabilities corrected based on the supervised topic names registered with the supervised topic list 16B read at Step S200. The processing at Step S206 calculates one topic vector 41 for each of the sentences.

Then, the probability calculation unit 20G clusters the sentences included in the processing target sentence set into the groups of sentences (sentence groups) each including the predetermined number of clustered sentences, and then, calculates the topic vector 41 for each of the sentence groups (Step S208). As described above, the probability calculation unit 20G performs the processing, such as the normalization and the addition of the probabilities for each of the topic categories, on the topic vector 41 corresponding to each of the sentences included in the sentence group, and thereby, calculates the topic vector 41 corresponding to the sentence group (Step S208). The processing at Step S208 calculates one topic vector 41 for each of the sentence groups.

Then, the similarity calculation unit 20H calculates the degree of similarity of the topic vectors 41 between the sentences included in the processing target sentence set 40. As describe above, in the present embodiment, the similarity calculation unit 20H calculates the degree of similarity of the topic vectors 41 between the adjacent sentence groups included in the processing target sentence set 40 (Step S210).

Then, the group division unit 20I divides the sentences included in the processing target sentence set 40 into the groups G according to the degree of similarity calculated at Step S210 (Step S212). Then, this routine ends.

Figure 12:
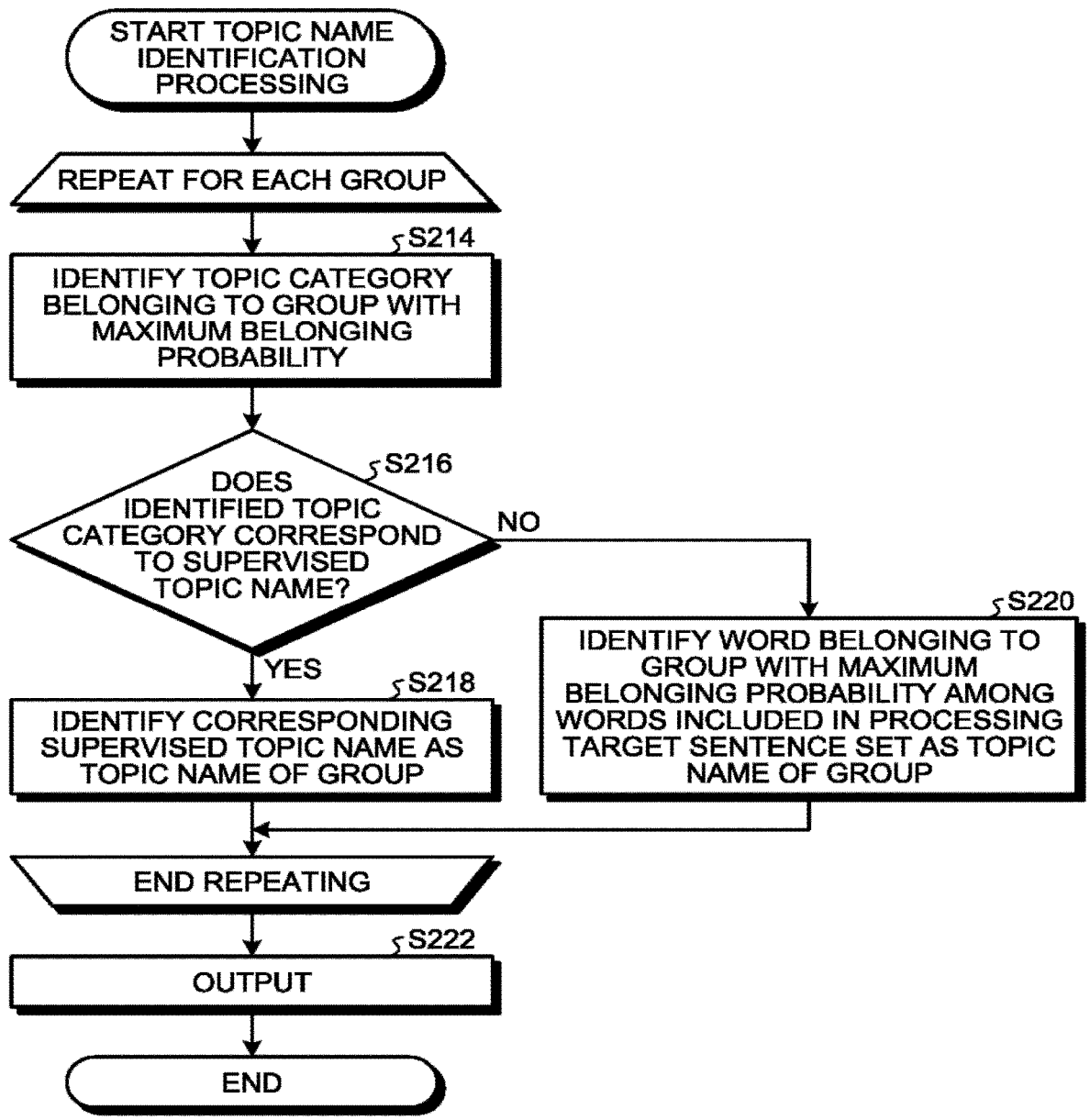
FIG. 12 is a flowchart illustrating an example of a procedure of topic name identification processing.

The following describes an example of a procedure of the topic name identification processing (Step S104, refer to FIG. 10) performed by the identification unit 20B. FIG. 12 is a flowchart illustrating the example of the procedure of the topic name identification processing.

The identification unit 20B repeatedly performs the processing at Steps S214 to S218 for each of the groups G divided by the division processing at Step S102 (FIGS. 10 and 11).

First, the determination unit 20J identifies the topic category belonging to the group G with the maximum belonging probability (Step S214). The determination unit 20J then determines whether the topic category identified at Step S214 corresponds to any of the supervised topic names registered with the supervised topic list 16B read at Step S200 (refer to FIG. 11) (Step S216).

If a correspondence is determined to be present (Yes at Step S216), processing at Step S218 is performed. At Step S218, the first identification unit 20K identifies the supervised topic name determined at Step S216 as the topic name of the group G to be processed (Step S218).

If no correspondence is determined to be present (No at Step S216), processing at Step S220 is performed. At Step S220, the second identification unit 20L identifies, as the topic name of the group G, a word belonging to the group G with the maximum belonging probability among the words included in the processing target sentence set 40 (Step S220).

After the identification unit 20B has performed the processing at Steps S214 to S218 for all the groups G divided by the division processing at Step S102 (FIGS. 10 and 11), processing at Step S222 is performed.

At Step S222, the identification unit 20B outputs the topic names identified by the processing at Steps S214 to S220 for each of the groups G, the sentences belonging to the groups G corresponding to the topic names, and the speech timing corresponding to each of the sentences, to the display controller 20C (Step S222). Then, this routine ends. The display controller 20C that has received these pieces of information uses the received pieces of information to generate the display screen 60 (refer to Step S106 of FIG. 10).

As described above, the information processing device 10 according to the present embodiment is provided with the division unit 20A and the identification unit 20B. The division unit 20A divides the sentences included in the processing target sentence set 40 into the groups G based on the supervised topic list 16B representing the list of the supervised topic name set in advance. The identification unit 20B identifies the topic names for the groups G based on the supervised topic list 16B.

Accordingly, the information processing device 10 according to the present embodiment can identify the topic name more similar to the actual topic for each section closer to that of the actual topic for the processing target sentence set 40.

Figure 13:
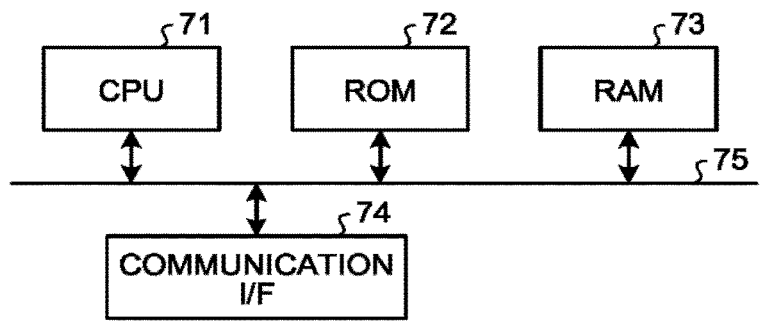
FIG. 13 is an explanatory diagram illustrating a hardware configuration example of the information processing device according to the embodiment.

The following describes a hardware configuration of the information processing device 10 according to the present embodiment. FIG. 13 is an explanatory diagram illustrating a hardware configuration example of the information processing device 10 according to the present embodiment.

The information processing device 10 according to the present embodiment is provided with a control device such as a CPU 71, storage devices such as a read-only memory (ROM) 72 and a random access memory (RAM) 73, a communication interface (I/F) 74 connected to a network to perform communication, and a bus 75 for connecting the units.

A program to be executed by the information processing device 10 according to the present embodiment is provided by being incorporated in advance in the ROM 72 or the like.

The program to be executed by the information processing device 10 according to the present embodiment may be configured to be provided as a computer program product by being recorded as a file in an installable format or an executable format on a computer-readable recording medium, such as a compact disc read-only memory (CD-ROM), a flexible disk (FD), a compact disc-recordable (CD), or a digital versatile disc (DVD).

Still alternatively, the program to be executed by the information processing device 10 according to the present embodiment may be configured to be provided by being stored in a computer connected to a network, such as the Internet, to be downloaded through the network. The program to be executed by the information processing device 10 according to the present embodiment may be configured to be provided or distributed through a network, such as the Internet.

The program executed by the information processing device 10 according to the present embodiment can cause a computer to function as the units of the information processing device 10 described above. In this computer, the CPU 71 can read the program from the computer-readable recording medium into a main memory, and execute the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory; and
a hardware processor configured to function as:
a divider configured to divide a plurality of sentences included in a processing target sentence set into a plurality of groups based on a supervised topic list representing a list of supervised topic names that is set in advance; and
an identifier configured to identify a topic name for each of the groups based on the supervised topic list, wherein
the divider comprises:
a classifier configured to classify words included in the sentence set into a plurality of topic categories;
a probability calculator configured to calculate, when calculating probabilities, each of which represents a probability of belonging of each of the topic categories to each of the sentences included in the sentence set, a probability of belonging of a topic category corresponding to a supervised topic name presented in the supervised topic list to be higher than an actual probability, based on the supervised topic list;
a similarity calculator configured to calculate a degree of similarity between probabilities of belonging of topic categories to adjacent sentences that are adjacent in position in the sentence set; and
a group divider configured to divide the sentences included in the sentence set into the groups according to the degree of similarity.

2. The information processing device according to claim 1, wherein
the probability calculator is configured to calculate a topic vector for each of the sentences included in the sentence set based on the supervised topic list, each topic vector representing a probability of belonging of each of topic categories to a respective sentence in the sentence set, and the similarity calculator is configured to calculate a degree of similarity between topic vectors of the adjacent sentences.

3. The information processing device according to claim 2, wherein the probability calculator is configured to calculate the topic vector for each of the sentences included in the sentence set based on a word belonging probability representing a probability of belonging of a word included in the sentence set to a corresponding topic category and based on the supervised topic list.

4. The information processing device according to claim 2, wherein the similarity calculator is configured to:
cluster the sentences included in the processing target sentence set into sentence clusters each including a predetermined number of clustered sentences;
calculate, for each sentence cluster, an integrated topic vector in which topic vectors for sentences belonging to the sentence cluster are integrated; and
calculate a degree of similarity between integrated topic vectors of adjacent sentence clusters.

5. The information processing device according to claim 1, wherein the group divider is configured to divide the sentences included in the sentence set into the groups, using, as delimiting positions, a number of positions between sentences.

6. The information processing device according to claim 1, wherein the identifier comprises:
a determiner configured to determine, for each of the groups, whether a topic category with a maximum belonging probability corresponds to any one of the supervised topic names in the supervised topic list;
a first identifier configured to identify a supervised topic name as a topic name for a group in response to the determiner determining a topic category with a maximum belonging probability corresponds to one of the supervised topic names in the supervised topic list; and
a second identifier configured to identify a word with a maximum belonging probability as a topic name for a group in response to the determiner determining a topic category with a maximum belonging probability does not correspond to one of the supervised topic names in the supervised topic list.

7. The information processing device according to claim 1, wherein the hardware processor is configured to further function as a display controller configured to display the identified topic names for each of the groups.

8. The information processing device according to claim 7, wherein the display controller is configured to display supervised topic names and topic names that are not supervised topic names in different display modes.

9. The information processing device according to claim 7, wherein the hardware processor is configured to further function as:
a receiver configured to receive designation of one of displayed topic names; and a hierarchical display controller configured to cause the identifier to process a group corresponding to a designated topic name.

10. A method for information processing, the method comprising:
dividing a plurality of sentences included in a processing target sentence set into a plurality of groups based on a supervised topic list representing a list of supervised topic names that is set in advance; and
identifying a topic name for each of the groups based on the supervised topic list, wherein
the dividing comprises:
classifying words included in the sentence set into a plurality of topic categories;
calculating, when calculating probabilities, each of which represents a probability of belonging of each of the topic categories to each of the sentences included in the sentence set, a probability of belonging of a topic category corresponding to a supervised topic name presented in the supervised topic list to be higher than an actual probability, based on the supervised topic list;
calculating a degree of similarity between probabilities of belonging of topic categories to adjacent sentences that are adjacent in position in the sentence set; and
dividing the sentences included in the sentence set into the groups according to the degree of similarity.

11. A computer program product having a non-transitory computer readable medium including programmed instructions for information processing, wherein the instructions, when executed by a computer, cause the computer to perform:
dividing a plurality of sentences included in a processing target sentence set into a plurality of groups based on a supervised topic list representing a list of supervised topic names that is set in advance; and
identifying a topic name for each of the groups based on the supervised topic list, wherein
the dividing comprises:
classifying words included in the sentence set into a plurality of topic categories;
calculating, when calculating probabilities, each of which represents a probability of belonging of each of the topic categories to each of the sentences included in the sentence set, a probability of belonging of a topic category corresponding to a supervised topic name presented in the supervised topic list to be higher than an actual probability, based on the supervised topic list;
calculating a degree of similarity between probabilities of belonging of topic categories to adjacent sentences that are adjacent in position in the sentence set; and
dividing the sentences included in the sentence set into the groups according to the degree of similarity.

* * * * *